March 29, 1927.
J. M. STONE
DUST CAP
Filed July 18, 1923
1,622,358
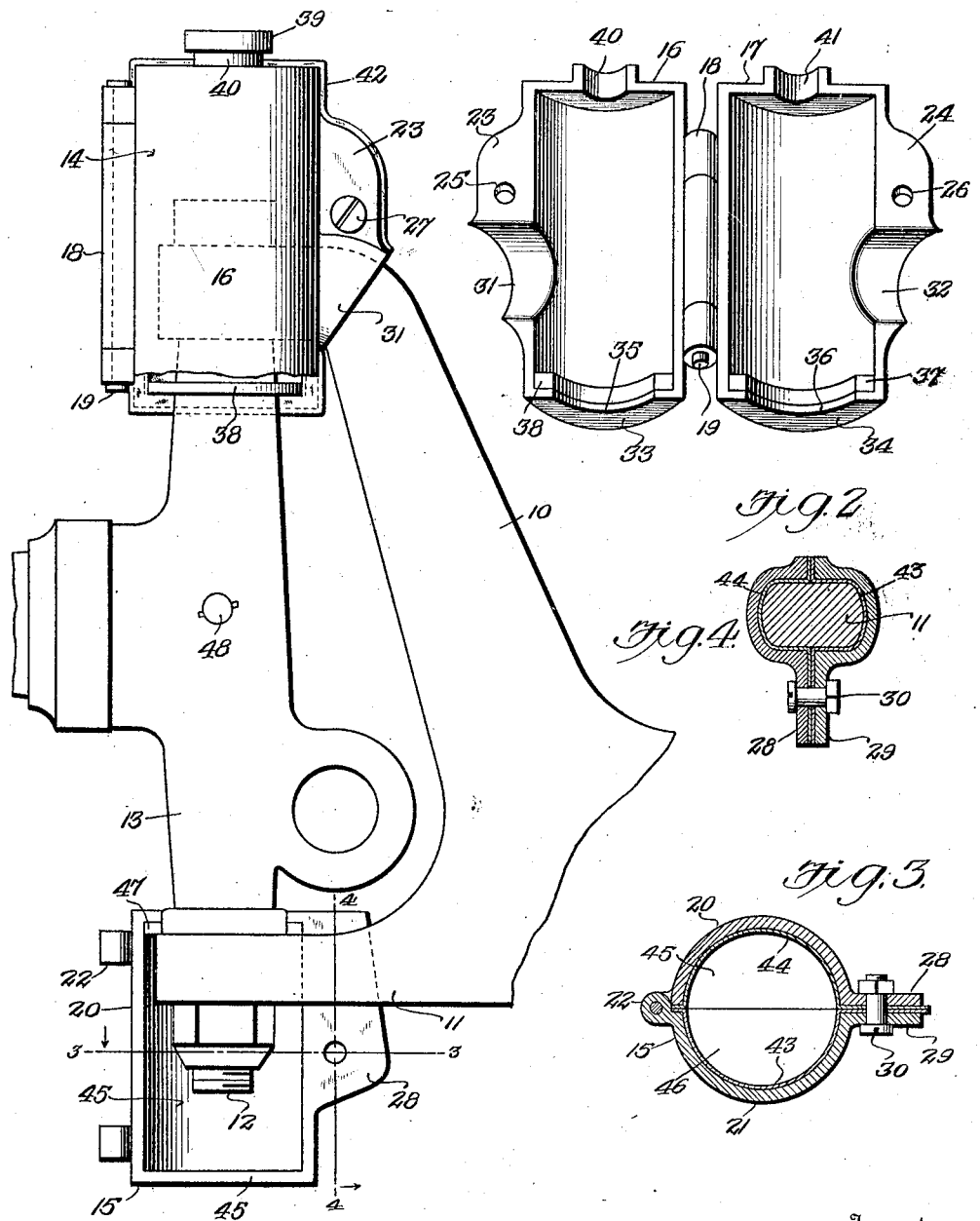

Patented Mar. 29, 1927.

1,622,358

UNITED STATES PATENT OFFICE.

JACOB M. STONE, OF BRECKENRIDGE, TEXAS, ASSIGNOR TO LEONORE F. STONE, OF BRECKENRIDGE, TEXAS.

DUST CAP.

Application filed July 18, 1923. Serial No. 652,381.

The invention relates to dust caps, and has as an object the provision of a dust cap for the steering knuckle of an automobile, which may be easily applied thereto. A further object of the invention is the provision of a dust cap which will act also as a lubricant retainer. A further object of the invention is the provision of a dust cap which may be made by stamping from metal, so that it will be cheap to manufacture and which will become a permanent part of the automobile when once applied thereto.

An illustrative embodiment of the invention is shown in the accompanying drawing, in which—

Figure 1 is a detail elevation of the end of an axle, and a portion of a steering knuckle, with the dust cap applied at each end of the knuckle, a portion of one of the caps being omitted.

Fig. 2 is a perspective view of the upper dust cap of Fig. 1 opened.

Fig. 3 is a horizontal section on line 3, 3 of Fig. 1, showing the complete dust cap alone and omitting the steering knuckle.

Fig. 4 is a detail vertical section on line 4, 4 of Fig. 1, a portion of the axle being omitted.

The forked ends of the axles are shown at 10 and 11, the steering bolt or spindle at 12, and the steering knuckle at 13. These portions of an automobile are exposed to the dust and mud from the road and are in constant relative motion during the steering of the machine, with the result that the grit finds its way between the friction surfaces, and the parts are rapidly worn. No provision has heretofore been made, of which I am aware, of a dust-tight covering for these parts, nor of means to retain lubricant therein. For this purpose there is provided by the invention dust caps 14 and 15 for the top and bottom of the steering knuckle, which caps differ from each other in such a manner as to fit the respective portions of the steering knuckle and the axle. Each different make of car will require a cap designed particularly therefor where the parts in consideration differ materially.

As at present advised, it is preferred to make the cap of metal and of two parts, the parts of cap 14 being shown at 16 and 17 joined by a hinge 18, the portions of which hinge are preferably made integral with the material of the portions 16, 17, and joined together by a pintle 19. Likewise the cap 15 is preferably formed of two portions 20, 21 joined by a hinge 22. To secure the parts in the closed condition when placed upon the machine the flanges 23, 24 of the cap 14 are perforated, as at 25, 26, for the reception of a bolt 27, and the flanges 28, 29 of the cap 15 are likewise secured together by means of bolt 30. To enclose the portion of the axle 10, the flanges 23, 24 of the cap 14 are shown as provided with recesses 31, 32 of such a size and form as to clasp about the end of the axle when the device is placed. The end of the closures 33, 34 are also each formed with a semicircular recess 35, 36 adapted to encircle the upper portion of the steering knuckle to enclose the same.

It will thus be seen that the cap will be stationary as respects the end of the axle, and that the steering knuckle will freely revolve in the circular opening formed by the two semicircles 35, 36. To make the joint between the ends 33, 34 of the dust cap and the steering knuckle dust-tight, a packing of leather, felt or the like is supplied. As shown, the packing is made in two halves 37, 38 for convenience in application, but if the device is to be applied during the manufacture of the machine, or it is desired to remove the knuckle during application of the device, this washer could be made integral and could be slipped over the knuckle before the placing of the steering bolt 12.

For the purpose of introducing lubricant a lubricant-receiving fitting 39 is shown as secured to the upper end of the cap, semicircular recesses 40, 41, being formed in the two halves of the cap for its reception. To make the joint between the two halves 16, 17 of the cap tight when closed, sheets of felt, or other suitable packing material 42 are preferably placed in the joint, the center portion of the sheets being cut away, or distributed around the surfaces of the interior of the cap, as shown in Fig. 3, at 43, 44, and the material of the packing being compressed by tightening of the bolt 27. To make the cap tight about the ends 10 and 11 of the axle, the felt 42 is preferably pressed into the openings 31, 32 in cap 14, or the corresponding openings in cap 15, so as to pack the cap at these points, as shown in Fig. 4.

The lower cap 15 differs from the upper cap by the difference in form, due to its position, and the differenec in shape of the portion 11 of the axle from the portion 10 thereof. Also, as lubricant placed in the upper cap 14 will find its way downward about the steering bolt, it is not thought necessary to provide an oil fitting upon the cap 15. The end closures 45, 46 therefor are of such dimensions and forms as to meet when the cap is closed. A washer 47 is provided in the cap 15 also.

Upon some automobiles, a lubricant fitting for application of a pressure lubricating device is provided upon the steering knuckle, as at 48. The operation of this device is such that the lubricant when injected squeezes out at the top and bottom of the knuckle, and when the caps of the present invention are in place this lubricant will find its way to and eventually fill the interior of the caps. When such a device is used the oil cup 39 will become unnecessary, and the ends of the two halves of the cap 14 can be made like the lower ends of the two halves of the cap 15.

The application of and operation of the device will be clear from the above description, and minor changes may be made in the physical embodiment of the invention without departing from its spirit.

I claim:

1. A dust cap for a steering knuckle comprising complementary shells provided with registering recesses at one end adapted to receive the end of a steering knuckle, said shells having registering recesses in their longitudinal meeting edges adapted to surround the end of an axle, and means for clamping said shells in closed position.

2. A dust cap comprising in combination a pair of shells, a hinge longitudinally connecting said shells, recesses in one of said shells adapted to receive a portion of the end of the knuckle and a portion of the end of the axle, respectively, the remaining shell adapted to complete the enclosure of the knuckle and axle, respectively, means to hold said shells on said knuckle and axle, means to pack the said shells on said knuckle and axle, and means permitting admission of oil to the interior of said shells.

JACOB M. STONE.